US008793440B2

(12) United States Patent
Miller et al.

(10) Patent No.: US 8,793,440 B2
(45) Date of Patent: Jul. 29, 2014

(54) ERROR DETECTION FOR FILES

(75) Inventors: Thomas J. Miller, Yarrow Point, WA (US); Jonathan M. Cargille, Seattle, WA (US); William R. Tipton, Seattle, WA (US); Surendra Verma, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 921 days.

(21) Appl. No.: 12/817,219

(22) Filed: Jun. 17, 2010

(65) Prior Publication Data

US 2011/0314229 A1 Dec. 22, 2011

(51) Int. Cl.
*G06F 12/08* (2006.01)
*G06F 11/00* (2006.01)
*G06F 11/07* (2006.01)
*G06F 17/30* (2006.01)

(52) U.S. Cl.
CPC .......... *G06F 12/0828* (2013.01); *G06F 11/004* (2013.01); *G06F 11/0766* (2013.01); *G06F 17/30174* (2013.01)
USPC ............. 711/141; 711/154; 711/156; 714/52; 714/54; 714/746; 714/764

(58) Field of Classification Search
CPC .............. G06F 12/0828; G06F 11/004; G06F 11/0766; G06F 17/30174
USPC .............. 711/141, 154, 156; 714/52, 54, 746, 714/764
See application file for complete search history.

(56) References Cited

U.S. PATENT DOCUMENTS

| 5,504,857 | A |   | 4/1996  | Baird |
|-----------|---|---|---------|-------|
| 5,594,863 | A | * | 1/1997  | Stiles ............................. 714/15 |
| 5,873,118 | A | * | 2/1999  | Letwin .......................... 711/156 |
| 5,964,835 | A | * | 10/1999 | Fowler et al. ................. 709/216 |
| 6,629,264 | B1|   | 9/2003  | Sicola |

(Continued)

FOREIGN PATENT DOCUMENTS

| CN | 1936853   | 3/2007  |
|----|-----------|---------|
| CN | 101051324 | 10/2007 |
| CN | 101529396 | 9/2009  |

OTHER PUBLICATIONS

Calin., "Fast File Writes Without Having Large Data Flushes to Disk", Retrieved at << http://www.eggheadcafe.com/software/aspnet/29584537/fast-file-writes-without.aspx >>, Mar. 23, 2007, pp. 4.
"Xbox 360 HDD Cache Clear Code Discovered [Update 1]", Retrieved at << http://www.joystiq.com/2006/06/09/xbox-360-hdd-cache-clear-code-discovered/ >>, Jun. 9, 2006, pp. 18.

(Continued)

*Primary Examiner* — Stephen Elmore
(74) *Attorney, Agent, or Firm* — John Jardine; Andrew Sanders; Micky Minhas

(57) ABSTRACT

Aspects of the subject matter described herein relate to error detection for files. In aspects, before allowing updates to a clean file, a flag marking the file as dirty is written to non-volatile storage. Thereafter, the file may be updated as long as desired. Periodically or at some other time, the file may be marked as clean after all outstanding updates to the file and error codes associated with the file are written to storage. While waiting for outstanding updates and error codes to be written to storage, if additional requests to update the file are received, the file may be marked as dirty again prior to allowing the additional requests to update the file. The request to write a clean flag regarding the file may be done lazily.

19 Claims, 6 Drawing Sheets

(56) References Cited

U.S. PATENT DOCUMENTS

| | | | |
|---|---|---|---|
| 6,643,672 | B1 | 11/2003 | Lebel |
| 6,925,476 | B1 * | 8/2005 | Multer et al. ............... 1/1 |
| 6,928,555 | B1 * | 8/2005 | Drew ....................... 726/24 |
| 7,130,855 | B2 * | 10/2006 | Lebel ....................... 707/613 |
| 7,334,124 | B2 | 2/2008 | Pham et al. |
| 7,440,966 | B2 | 10/2008 | Adkins et al. |
| 7,441,274 | B1 * | 10/2008 | Drew ....................... 726/24 |
| 7,533,127 | B2 * | 5/2009 | Zimmerman et al. ........ 1/1 |
| 7,552,148 | B2 * | 6/2009 | Liu et al. ................... 1/1 |
| 7,617,259 | B1 | 11/2009 | Muth et al. |
| 7,620,721 | B2 * | 11/2009 | Suriyanarayanan et al. . 709/226 |
| 7,840,752 | B2 * | 11/2010 | Hu et al. ................... 711/113 |
| 8,433,865 | B2 | 4/2013 | Miller |
| 2002/0078244 | A1 | 6/2002 | Howard |
| 2003/0140070 | A1 | 7/2003 | Kaczmarski |
| 2004/0078396 | A1 * | 4/2004 | Lebel ....................... 707/201 |
| 2004/0225873 | A1 | 11/2004 | Diaz |
| 2004/0267699 | A1 * | 12/2004 | Zimmerman et al. ........ 707/1 |
| 2005/0204108 | A1 | 9/2005 | Ofek |
| 2005/0267914 | A1 | 12/2005 | Moore et al. |
| 2008/0010515 | A1 | 1/2008 | Robinson et al. |
| 2008/0077590 | A1 * | 3/2008 | Pandit ....................... 707/8 |
| 2008/0294700 | A1 * | 11/2008 | Sugimoto ................... 707/200 |
| 2011/0145527 | A1 | 6/2011 | Miller |
| 2011/0307449 | A1 | 12/2011 | Cargille |
| 2011/0314230 | A1 | 12/2011 | Zhang |

OTHER PUBLICATIONS

Riska, et al., "Disk Drive Level Workload Characterization", Retrieved at http://www.usenix.org/event/usenix06/tech/full_papers/riska/riska_html/index.html >>, USENIX Annual Technical Conference, Proceedings of the annual conference on USENIX '06 Annual Technical Conference, May 30-Jun. 3, 2006, pp. 14.

"Can Not Write to File in Java", Retrieved at << https://www.linuxquestions.org/questions/programming-9/can-not-write-file-java-388809/ >>, Retrieved Date: Mar. 29, 2010, pp. 5.

"Lecture 19: Transactions: Reliability from Unreliable Components", Retrieved at << http://www.edugrid.ac.in/webfolder/OpSystems/9_FileSystems/Uni_Washington/transactions(l19).pdf >>, Retrieved Date: Mar. 29, 2010, pp. 8.

"Error detection and correction", Retrieved at http://en.wikipedia.org/wiki/Error_detection_and_correction >>, Retrieved Date: May 6, 2010, pp. 9.

PCT International Search Report and Written Opinion for Application No. PCT/US2010/056311, Jul. 18, 2011.

"International Search Report", Mailed Date: Dec. 7, 2011, Application No. PCT/US2011/039071, Filed Date: Jun. 3, 2011, pp. 9.

AU Patent Examination Report No. 1 for Application No. 2010328591, Feb. 12, 2014.

U.S. Appl. No. 12/635,725, filed Dec. 11, 2009, Thomas J. Miller.

U.S. Appl. No. 13/872,896, filed Apr. 29, 2013, Thomas J. Miller.

* cited by examiner

ERROR DETECTION FOR FILES

BACKGROUND

Data on various electronic storage media may become corrupted over time. With some types of media such as CDs, DVDs, magnetic tapes, floppy disks and others, the media actually starts to decay and consequently loses data. With other types of media such as EPROMs and flash memory, electrical charges may dissipate leading to lost data. Although it is generally known that hard drives may lose data when they crash or otherwise become inoperative, what is not well known, at least by those outside of the industry, is that even well-functioning hard drives may have data that becomes silently or otherwise corrupted.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to error detection for files. In aspects, before allowing an update to a clean file, a flag marking the file as dirty is written to non-volatile storage. Thereafter, the file may be updated as long as desired. Periodically or at some other time, the file may be marked as clean after all outstanding updates to the file and error codes associated with the file are written to storage. While waiting for outstanding updates and error codes to be written to storage, if additional requests to update the file are received, the file may be marked as dirty again prior to allowing the additional requests to update the file. The request to write a clean flag regarding the file may be done lazily.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

Exemplary Operating Environment

Figure 1:
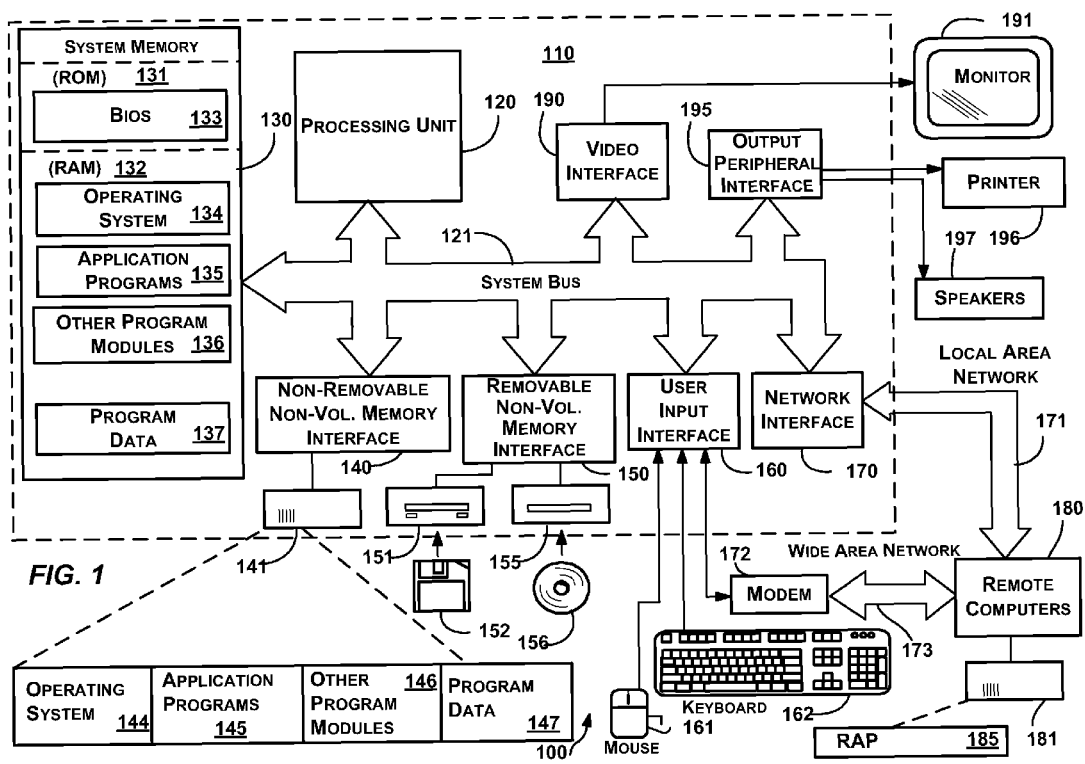
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

It will be appreciated that the network connections shown are exemplary and other means of establishing a communications link between the computers may be used.

Error Detection

Figure 2:
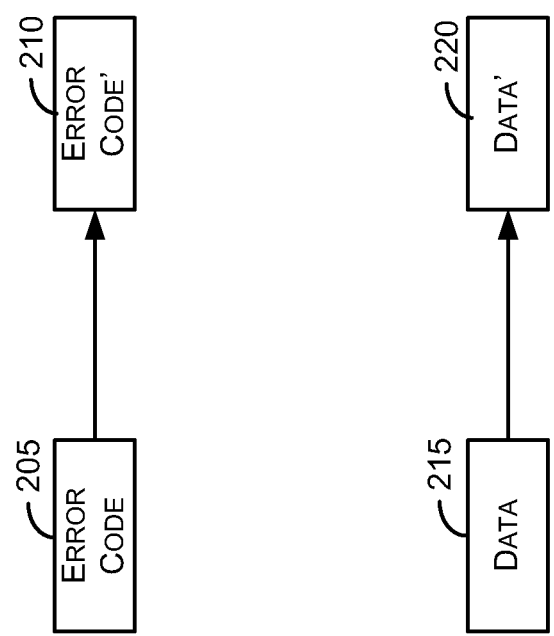
FIG. 2 is a block diagram that illustrates error codes and data in accordance with aspects of the subject matter described herein.

As mentioned previously, data on storage media may become corrupted. FIG. 2 is a block diagram that illustrates error codes and data in accordance with aspects of the subject matter described herein. In one embodiment, an error code 205 is written to storage in conjunction with writing data 215 to the storage. The error code 205 comprises data that may be used to verify that the data 215 has not become corrupted. The error code 205 may be simple or complex and may include information to detect different types of errors.

For example, a parity bit may be used to detect parity errors, while a more sophisticated error code such as a cyclic redundancy check (CRC) may be used to detect error bursts of several bits. Some error codes such as a message authentication code (MAC), cryptographic hash functions, and some other function may be used to detect other data corruptions that may occur to data on storage.

An error code may be used in error detection or in error detection and correction. For example, an error code may include data to detect errors but not to correct the errors. As another example, an error code may include data to detect and correct certain types of errors.

The examples above are not intended to be all-inclusive or exhaustive of the types of error codes that may be used by aspects of the subject matter described herein. Indeed, based on the teachings herein, those skilled in the art may recognize other error codes that may be used without departing from the spirit or scope of aspects of the subject matter described herein.

A problem with error codes may be illustrated with reference to FIG. 2. When the error code and the data associated with the error code are both written to non-volatile storage, then the error code may be reliably used to detect corruption of the data within the limits of the characteristics of the error code. When either the data is written to non-volatile storage or the error code is written to non-volatile storage but the data and the error code are not both written to non-volatile storage, this poses a potential problem.

In some implementations, error codes may be appended to or inserted in and written together with the data associated with the error codes. For example, with a database, the database management system (DMBS) may reserve space in each page to write to storage and may compute and store an error code in the space when changes are made to the page. When a page is written to storage, the error code of the page is also written to storage.

In other implementations, however, such as file systems, the error codes may be stored separately from the data associated with the error codes. For example, error codes may be stored in metadata regarding files, in one or more files separate from the data files, in designated locations on a storage device, and the like.

In these implementations, there is a race condition as to which gets written to storage first—the data or the error code associated with the data. For example, referring to FIG. 2, if the error code 210 gets written to storage and the data 220 does not get written to storage, the error code 210 may give erroneous results if applied to the data 215. Similarly, if the data 220 gets written to storage while the error code 210 does not get written to storage, the error code 205 may give erroneous results if applied to the data 220. A system crash or disk becoming inoperative between writing the error code 210 and the data 220 may cause problems in these types of implementations. Other disk errors such as lost or misdirected writes may also cause problems in these types of implementations.

The examples above are not intended to be all inclusive or exhaustive. Indeed, based on the teachings herein, those skilled in the art may recognize other storage scenarios in which the teachings herein may be applied without departing from the spirit or scope of aspects of the subject matter described herein.

To address this and other problems, the following actions may be taken:

1. A file may be marked as clean. Clean means that the error code and the data have both been successfully written to non-volatile storage or that the file is new and has not been written to. Marking a file as clean may, for example, take the form of setting or clearing a bit associated with the file and writing the bit to non-volatile storage.

2. After the file has been marked as clean, an application or other data writer may seek to change the file. To do this, the data writer may send a request to write to the file to a file system.

3. Upon receiving the first request (e.g., the first request after the file has been marked as clean), the file system may set a dirty flag on the file and may write the dirty flag to storage. The file system may ensure that the dirty flag is actually written to storage before fulfilling the first request from the data writer. One way of ensuring that the dirty flag is actually written to storage is to send a flush command to the storage and to receive confirmation that the flush command succeeded. Another way of ensuring that the dirty flag is actually written to storage is through force unit access (FUA). FUA indicates that a write is to be written to non-volatile storage of a storage device, not just the cache. In various storage devices there may be other mechanisms for ensuring that data is written to storage that may be used without departing from the spirit or scope of aspects of the subject matter described herein.

4. The file system may receive multiple write requests regarding the file. In updating data for the file, the file system may create a new error code for each page that is to be written to storage.

5. Periodically, upon demand, at file close, or at other times, the file system may ensure that the data and all error codes associated with the file are written to storage. To do this, the file system may hold incoming requests, if any, to write to the file and may queue them until the file system has received an indication that the data and all error codes have been written to the storage.

The indication that the data and all error codes have been written to storage may take many forms. For example, in one embodiment, the file system may issue a flush command and the indication may include receiving an acknowledgment from the storage device that the flush command successfully completed. In another embodiment, the file system may track all outstanding writes to the storage. The storage may send an acknowledgment each time a write has successfully been written on the storage. When an acknowledgment for each outstanding write has been received, the file system may equate this with an indication that the data and all error codes have been successfully written to storage.

The examples above are not intended to be all-inclusive or exhaustive of the types of indications that the file system may receive to indicate that the data and all error codes have been written to the storage. Based on the teachings herein, those skilled in the art may recognize other indications indicative of the data and all error codes having been successfully written to storage that may be utilized without departing from the spirit or scope of aspects of the subject matter described herein.

6. After the file system receives an indication that the data and all error codes have been successfully written to storage, the file system may set the flag to indicate that the file is clean. In one embodiment, the file system may flush this flag to the storage before allowing subsequent operations on the file. In another embodiment, the file system may allow the flag to be lazily written to the storage and may concurrently allow other operations to be performed on the file. After the file system has set the flag (and perhaps flushed it to storage), the actions above may be repeated.

As one variation, if write requests for the file are received at or after step 5 above, resetting the flag as clean and writing it to disk may be omitted.

As another variation, writing the error codes and the flag to storage may be performed in the context of a transaction. A transaction is a group of operations that may include various properties including, for example, atomic, consistent, isolated, and durable. As used herein, a transaction includes at least the atomic property and may include one or more of the other properties above.

The atomic property is used to refer to a group of operations where either every operation in the group succeeds or the tangible effects (e.g., file changes) of the operations in the group are undone, discarded, or not applied. For simplicity, the term discarded is sometimes used herein to refer to taking any actions appropriate to ensure that any changes made in context of the transaction are not reflected in the objects associated with the changes. Discarding may include undoing, discarding, not applying update operations, and the like.

For example, a bank transfer may be implemented as an atomic set of two operations: a debit from one account and a credit to another account. If one of the operations succeeds but the other does not succeed, then the transfer is either unfairly in favor of the bank or the account holder. Thus, in a transaction, either both operations succeed or the tangible effects (e.g., data stored to disk or memory) of any that did succeed is discarded.

When one or more objects are modified "in the context of a transaction," this means there is an assumption that the atomic property will be enforced with respect to the update operations issued to modify the one or more objects. For example, an application requesting modifications in the context of a transaction may safely assume that either all update operations to make the modifications will succeed or that the updates that did or would have succeeded will be discarded.

Thus, writing the flag and the error codes in the context of a transaction ensures that either the flag and error codes are all written to storage or that the updates that did make it to storage regarding the flag and error codes are discarded.

As another variation, the interval between flushing data regarding file updates and writing error codes in conjunction therewith may be tuned to one or more characteristics of a storage device storing the error codes. For example, with flash memory, the interval may be set to a few milliseconds, a set number of updates, or some other spacing whereas with a slower storage such as a hard disk, the interval may be set to hundreds of milliseconds, shorter, or longer, a larger number of updates, or some other spacing.

The actions above may be performed for copy on write file systems, file systems that do not perform copy on write, combinations thereof, and the like. In a copy on write file system, before a file is modified, a copy of the portion that is to be modified is copied to another location. In a write in place file system, the file is modified in place without copying the original portion to another location.

In one implementation, metadata associated with a file may be updated in the context of a transaction while data of the file is updated outside of the context of the transaction. The metadata may include one or more error codes as well as a flag indicating whether the file is dirty or clean. In this implementation, after a dirty flag has been written to disk, updates to the metadata of the file may be performed within a transaction.

In this implementation, an additional condition may be imposed for the transaction to successfully complete. In particular, for the transaction to complete successfully, the error codes included in the metadata may be verified by reading the file data and computing error codes therefrom. If the error codes match, the transaction is allowed to complete. If the error codes do not match, the transaction is aborted.

Aborting the transaction may undo the changes made to the metadata but not undo the changes made to the file data. If the transaction complete successfully, the file is marked as clean. If the transaction aborts, the clean flag is not persisted to storage and the dirty flag that is persisted to storage indicates that the file is potentially, but not necessarily, corrupted. In this implementation, the file may be updated potentially concurrently with setting the clean flag (e.g., in a transaction that may or may not be aborted).

Figure 3:
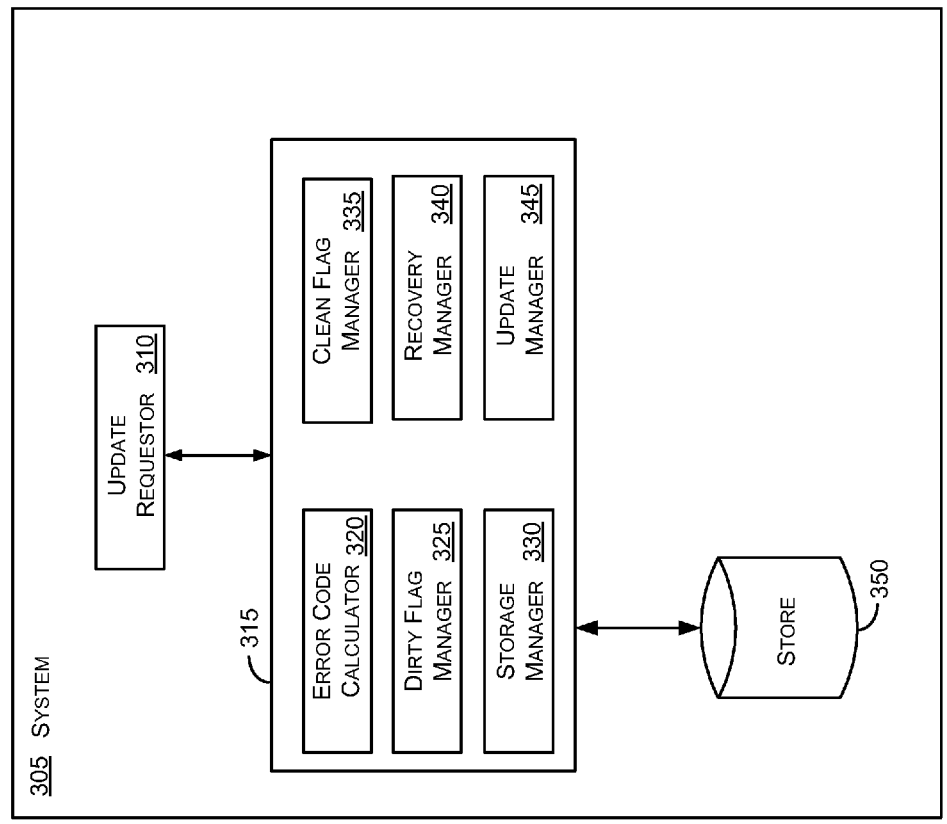
FIG. 3 is a block diagram that represents a system configured in accordance with aspects of the subject matter described herein.

FIG. 3 is a block diagram that represents a system configured in accordance with aspects of the subject matter described herein. The components illustrated in FIG. 3 are exemplary and are not meant to be all-inclusive of components that may be needed or included. In other embodiments, the components and/or functions described in conjunction with FIG. 3 may be included in other components (shown or not shown) or placed in subcomponents without departing from the spirit or scope of aspects of the subject matter described herein. In some embodiments, the components and/or functions described in conjunction with FIG. 3 may be distributed across multiple devices.

Turning to FIG. 3, the system 305 may include an update requestor 310, error detection components 315, a store 350, and other components (not shown). The error detection components 315 may include an error code calculator 320, a dirty flag manager 325, a storage manager 330, a clean flag manager 335, a recovery manager 340, and other components (not shown). The system 305 may be implemented on or by one or more computers (e.g., the computer 110 of FIG. 1).

The actions of the one or more of the error detection components 315 may be performed by one or more processes. The term "process" and its variants as used herein may include one or more traditional processes, threads, components, libraries, objects that perform tasks, and the like. A process may be implemented in hardware, software, or a combination of hardware and software. In an embodiment, a process is any computer mechanism, however called, capable of or used in performing an action. A process may be distributed over multiple devices or a single device.

In one embodiment, the error detection components 315 may be implemented as methods of an object. In another embodiment, one or more of the error detection components 415 may be implemented as one or more functions or portions thereof. The term "function" as used herein may be thought of as a portion of code that performs one or more tasks. Although a function may include a block of code that returns data, it is not limited to blocks of code that return data. A function may also perform a specific task without returning any data. Furthermore, a function may or may not have input parameters. A function may include a subroutine, a subprogram, a procedure, method, routine, or the like.

The update requestor 310 is any entity that seeks to update a file on the store 350. Some exemplary entities include applications, operating system components, and the like. The update requestor 310 may reside on an apparatus hosting one or more of the error detection components 315 or may reside on a different apparatus.

The store 350 comprises any storage media capable of storing files and that is managed by a file system. The store 350 may be external, internal, or include components that are both internal and external to the system 305. The term file as used herein includes directories, files, other file system objects, and the like. As used herein a file includes data.

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The error code calculator 320 is operable to determine error codes for files of the storage device. Each error code includes data regarding a file corresponding to the error code. As mentioned previously, the data usable to detect (and possible correct) one or more errors regarding whether the file or a portion thereof was correctly written to a storage device. The error code calculator 320 may be operable to re-compute an error code in conjunction with one or more changes that are made to the file.

The dirty flag manager 325 is operable write a dirty flag to the storage device prior to allowing any update to the file. The dirty flag manager 325 may check to determine whether the file has already has a dirty flag stored on the storage device. If the file already has a dirty flag stored on the storage device, the dirty flag manager 325 may refrain from writing a dirty flag to the file again.

The storage manager 330 may be operable to store and provide access to files of a storage device (such as the store 350). The storage manager may receive acknowledgments from the storage device as to the success or failure of writes to the storage device.

The clean flag manager 335 may be operable to set a clean flag and write the clean flag to the storage. In one embodiment, the clean flag and dirty flag for a file may be implemented as a bit, byte, or other data that is updated to indicate whether the file is clean or potentially dirty. In other words, indicating that a file is clean may involve setting or resetting a bit or other data that currently indicates that the file is potentially dirty while indicating that the file is dirty may involve resetting or setting the same bit or other data. In other words, the clean and dirty flags for a file may be represented as two different states of a single piece of data associated with the file.

The clean flag manager 335 may write the clean flag to storage lazily or prior to allowing additional updates to the file as mentioned previously. The clean flag manager 335 may write the clean flag in conjunction with (e.g., in the context of a transaction) or after all error codes associated with the file have been written to the storage device.

The recovery manager 340 may be operable to read data from the storage device that indicates whether the file is marked as dirty. If the data indicates that the file is marked as dirty, the recovery manager 340 may indicate that the file is suspect. Otherwise, the recovery manager 340 may indicate that the file is clean.

A file that is suspect may be corrupted or not corrupted. For example, if the system crashed or the disk become inoperable right after the dirty flag was written to disk but before other data was written to disk, the file may not be corrupted. On the other hand, if the system crashed or the disk become inoperable in the middle of a write to disk, after writing data but before writing a corresponding error code, or vice versa, the file may be corrupted.

The update manager 345 may be operable to receive a request to update the file from the update requestor 310. The update manager 345 may be further operable to utilize the dirty flag manager 325 to mark the file as dirty prior to allowing the update to proceed to the storage manager 330 to update the file in accordance with the request. The update manager 345 may be further operable to utilize the error code calculator 320 to determine an error code for the file in response to changes made to the file in response to a request to update the file. The update manager 345 may be further operable to use the clean flag manager 335 to indicate that a file is clean.

Figure 4:
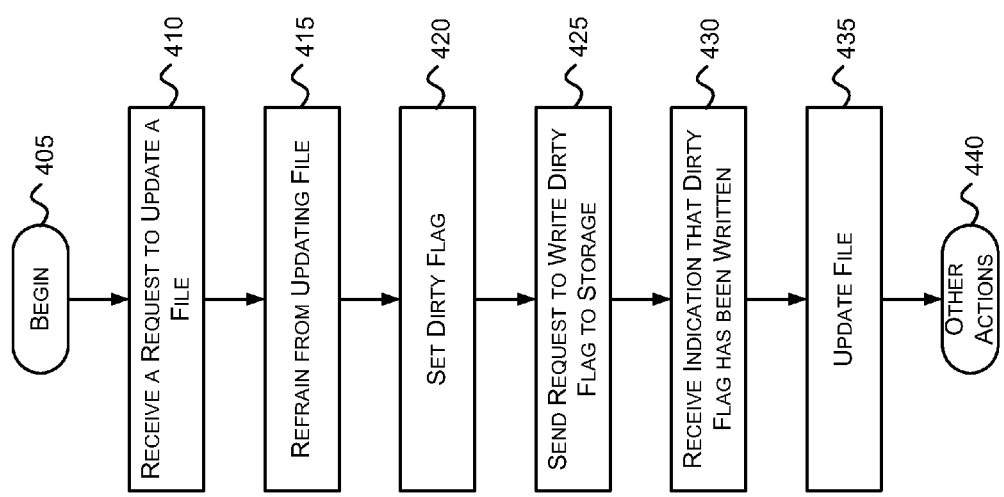
FIG. 4 is a flow diagram that generally represents some exemplary actions that may occur in preparation for updating a file that is currently marked as clean in accordance with aspects of the subject matter described herein.
Figure 5:
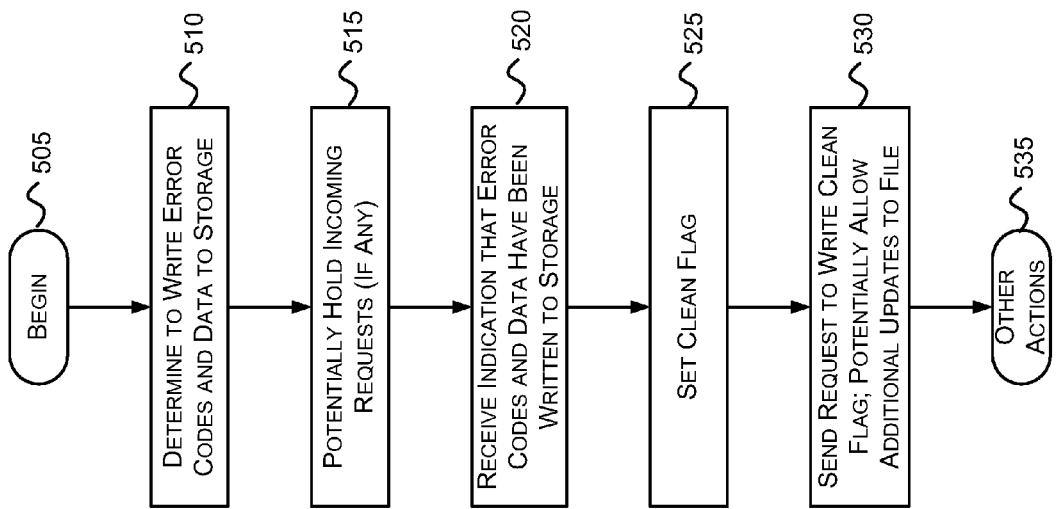
FIG. 5 is a flow diagram that generally represents some exemplary actions that may occur in conjunction with marking a file as clean in accordance with aspects of the subject matter described herein.
Figure 6:
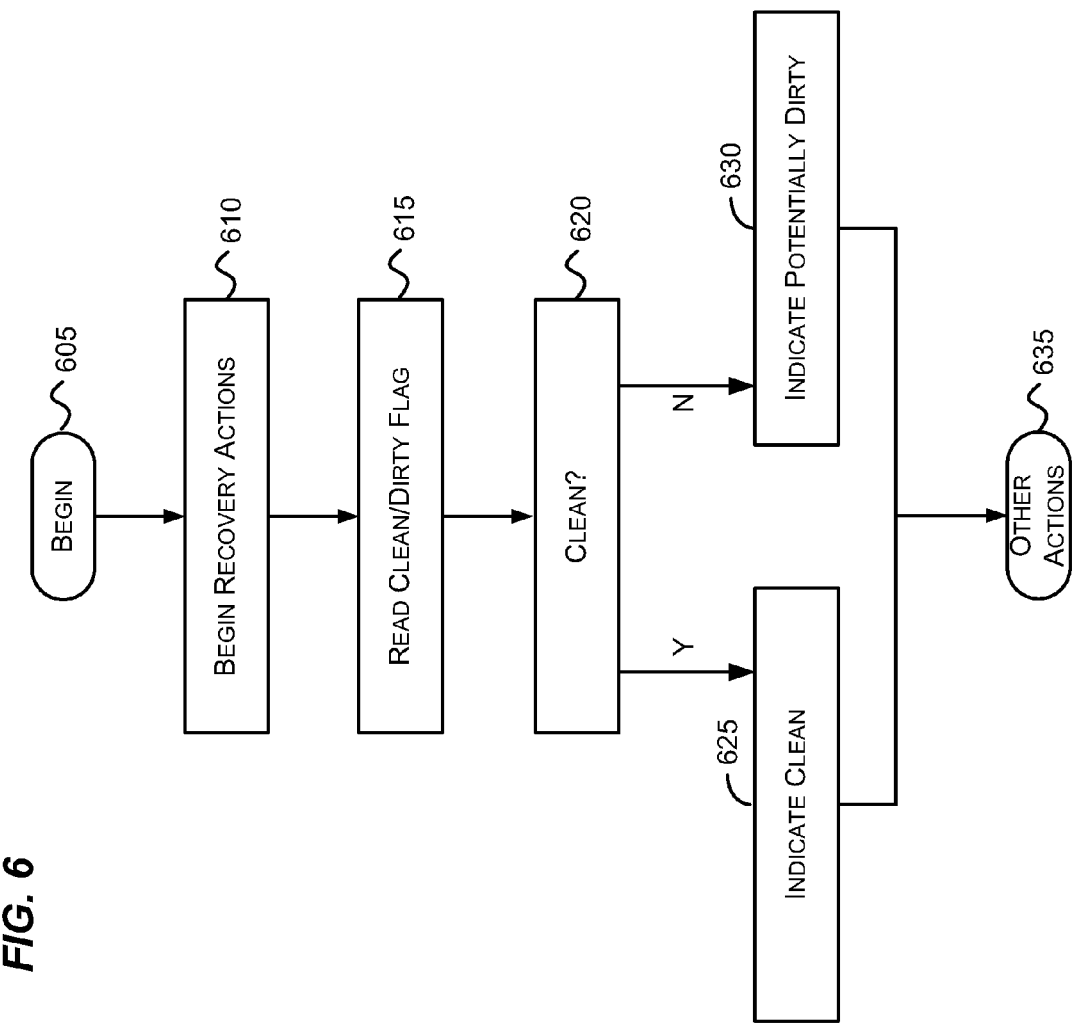
FIG. 6 is a flow diagram that generally represents some exemplary actions that may occur in recovery in accordance with aspects of the subject matter described herein.

FIGS. 4-6 are flow diagrams that generally represent actions that may occur in accordance with aspects of the subject matter described herein. For simplicity of explanation, the methodology described in conjunction with FIGS. 4-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 4 is a flow diagram that generally represents some exemplary actions that may occur in preparation for updating a file that is currently marked as clean in accordance with aspects of the subject matter described herein. Turning to FIG. 4, at block 405, the actions begin. At block 410, a request to update a file may be received. For example, referring to FIG. 3, the update manager 345 may receive a request to update a file from the update requestor 310.

At block 415, the file is not updated until after a dirty flag for the file has been written to non-volatile storage. For example, referring to FIG. 3, in response to the request to update the file, the update manager 345 refrains from updating the file until after a dirty flag for the file has been written to the store 350.

At block 420, the dirty flag is set for the file. For example, referring to FIG. 3, the update manager 345 instructs the dirty flag manager 325 to ensure that a dirty flag for the file is written to the store 350. This dirty flag indicates that the file is potentially dirty (e.g., suspect) as it is possible that the system could crash before any updates get written to the file or it is also possible that all data and error codes for the file could be written to the store 350 and that the system could crash before writing a clean flag for the file.

At block 425, a request to write the dirty flag to non-volatile storage is sent. For example, referring to FIG. 3, the dirty flag manager 325 may instruct the storage manager 330 to write a dirty flag to the store 350 for a file that is to be updated.

At block 430, an indication is received that the dirty flag has been written to the non-volatile storage. For example, referring to FIG. 3, the storage manager 330 receives an indication that the dirty flag has been successfully written to the store 350. The storage manager 330 may pass this indication to the dirty flag manager 325 which may relay the message to the update manager 345.

At block 435, the file is updated in accordance with the request. For example, referring to FIG. 3, the update manager 345 may send a request to write an update for the file to the storage manager 330 which may then update the file accordingly. Updating the file may be performed in place, by copy on write, or otherwise as previously indicated.

At block 440, other actions, if any, may be performed.

FIG. 5 is a flow diagram that generally represents some exemplary actions that may occur in conjunction with marking a file as clean in accordance with aspects of the subject matter described herein. At block 505, the actions begin.

At block 510, it is determined that the error codes and data associated with outstanding requests to update the file are to be written to non-volatile storage. For example, referring to FIG. 3, the update manager 345 may determine that it is time to flush all outstanding requests and error codes associated therewith to the store 350. This may be determined based on a time period expiring since this was last done, because a request to close the file has been received, or based on a variety of other factors as previously indicated.

At block 515, incoming requests to update the file, if any, may be held in a data structure. For example, referring to FIG. 3, the update manager 345 may hold incoming requests in a queue, list, or other data structure until currently pending error codes and data are written to non-volatile storage. In another alternative, if an additional request to update the file is received while waiting for currently pending error codes and data to be written to non-volatile storage, this may be treated in the same manner as if the file were marked clean and a request to update the file were received. In that case, any additional request(s) to update the file are held until data indicating that the file is dirty has been written to the storage. In other words, in this alternative, the actions associated with blocks 410-435 of FIG. 4 may be performed to ensure that the file is marked as dirty before additional updates are performed.

At block 520, an indication is received that error codes and data have been written to storage. For example, referring to FIG. 3, the storage manager 330 may receive an indication that the error codes and data associated with outstanding writes have been written to the store 350. In response, the storage manager 330 may inform the update manager 345.

At block 525, a clean flag is set to indicate that the file is no longer dirty. For example, referring to FIG. 3, the clean flag manager 335 may set a clean flag for a file.

At block 530, a request is sent to write the clean flag to storage. For example, referring to FIG. 3, the clean flag manager 335 may send a request to write the clean flag to storage to the storage manager 330. In response, the storage manager 330 may send instructions to write data corresponding to the clean flag to the store 350. As mentioned previously, the storage manager 330 may send data corresponding to the clean flag to the storage before other data is sent to the storage (e.g., via a flush) or may lazily send data corresponding to the clean flag to storage. In other words, the file may be updated in accordance with one or more incoming requests potentially concurrently with setting the clean flag and/or writing the clean flag to storage.

As mentioned previously, the clean flag and error codes may be written to non-volatile storage in the context of a transaction.

At block 535, other actions, if any, may be performed.

FIG. 6 is a flow diagram that generally represents some exemplary actions that may occur in recovery in accordance with aspects of the subject matter described herein. At block 605, the actions begin.

At block 610, recovery actions may commence. For example, referring to FIG. 3, in response to a system failure, the recovery manager 340 may commence recovery actions regarding files of the store 350. From the point of view of the error detection components 315, recovery actions may be limited to indicating whether each file is clean or potentially dirty. After indicating that a file is clean or potentially dirty, additional actions may be taken to verify whether the file is corrupted.

At block 615, the clean/dirty flag is read for a file. For example, referring to FIG. 3, the recovery manager 340 may read a clean/dirty flag for a file stored on the store 350. If the flag indicates that the file is marked as clean, this indicates that the error codes associated with the file were written to non-volatile storage prior to the recovery. If the flag indicates that the file is marked as dirty, this indicates that the file is suspect (e.g., potentially dirty) as indicated previously.

At block 620, if the flag indicates that the file is clean, the actions continue at block 625; otherwise the actions continue at block 630.

At block 625, an indication is made that the file is clean. For example, referring to FIG. 3, the recovery manager 340 may indicate to a recovery program (not shown) that a file is clean.

At block 630, an indication is made that the file is suspect. For example, referring to FIG. 3, the recovery manager 340 may indicate to a recovery program (not shown) that a file is suspect.

At block 635, other actions, if any, may be performed.

As can be seen from the foregoing detailed description, aspects have been described related error detection for files. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method performed by a computer, the method comprising:
   receiving a request to update a file;
   refraining from updating the file until after a dirty flag for the file has been written to non-volatile storage;
   setting a dirty flag to indicate the file is potentially dirty;
   sending a request to write the dirty flag to the non-volatile storage;
   receiving an indication that the dirty flag has been written to the non-volatile storage; and
   after receiving the indication, updating, by the computer, the file in accordance with the request to update the file.

2. The method of claim 1, further comprising:
   determining that error codes and data associated with outstanding requests to update the file are to be written to the non-volatile storage;
   in a data structure, holding an indication of one or more incoming requests, if any, to update the file;

receiving an indication that the data associated with the one or more outstanding requests to update the file has been written to the non-volatile storage;

receiving an indication that the error codes associated with the outstanding requests have been written to the non-volatile storage;

setting a clean flag to indicate that the file is no longer dirty; and sending a request to write the clean flag to the non-volatile storage.

3. The method of claim 2, further comprising updating the file in accordance with the one or more incoming requests potentially concurrently with setting the clean flag.

4. The method of claim 3, wherein setting the clean flag is done in context of a transaction, and further comprising comparing first error codes of metadata written in the context of the transaction with second error codes computed from the file as updated and aborting the transaction if the first error codes do not match the second error codes.

5. The method of claim 2, further comprising sending a flush command to flush the clean flag to the non-volatile storage prior to allowing the file to be updated in accordance with the one or more incoming requests to update the file.

6. The method of claim 2, wherein the determining comprises determining that a pre-defined period has expired.

7. The method of claim 6, further comprising tuning the pre-defined period according to one or more characteristics of the non-volatile storage.

8. The method of claim 2, wherein the determining comprises receiving a request to close the file.

9. The method of claim 2, further comprising writing the error codes and the clean flag to the non-volatile storage in context of a transaction.

10. The method of claim 1, wherein the updating comprises updating the file in place without copying the file or any portion thereof to another location of the non-volatile storage.

11. At least one memory storage device storing computer-executable instructions that, when executed by a computing device, cause the computing device to perform actions, comprising:

in a file system in which at least some files are updated by writing in place, as part of a recovery for a file maintained on the file system, performing the actions, comprising:

reading a flag indicative of whether the file was marked as dirty, the flag previously written to non-volatile storage prior to allowing any updates to the file;

if the flag indicates that the file was marked as dirty, indicating that the file is suspect;

if the flag indicates that the file was not marked as dirty, indicating that the file is clean.

12. The at least one memory storage device of claim 11, wherein the indicating that the file is clean comprises indicating that all error codes associated with the file are stored on the non-volatile storage.

13. The at least one memory storage device of claim 11, wherein the indicating that the file is suspect comprises indicating a potential that an error code associated with the file and/or update data associated with the error code was/were not written to the non-volatile storage.

14. The at least one memory storage device of claim 11, further comprising:

prior to the recovery, performing further actions, comprising:

receiving a request to update the file; and refraining from updating the file until after a dirty flag for the file has been written to the non-volatile storage.

15. The at least one memory storage device of claim 11, further comprising periodically writing all outstanding updates and error codes associated therewith to the non-volatile storage and thereafter lazily sending a request to write the flag to mark the file as clean.

16. A system comprising a computing device and at least one program module that are together configured for performing actions comprising:

providing access to files of a storage device;

determining error codes for files of the storage device, each error code including data regarding a file corresponding to the error code, the data usable to detect one or more errors regarding whether the file or a portion thereof was correctly written to the storage device;

writing a dirty flag to the storage device prior to allowing any update to the file;

receiving a request to update the file;

marking the file as dirty prior to allowing the update to the file in accordance with the request; and determining an error code for the file in response to changes made to the file in response to the request to update the file.

17. The system of claim 16, the at least one program module comprising a clean flag manager operable to set a clean flag and write the clean flag to the storage device lazily or prior to allowing additional updates to the file in conjunction with or after all error codes associated with the file have been written to the storage device.

18. The system of claim 16, the at least one program module comprising a recovery manager operable to read data from the storage device that indicates whether the file is marked as dirty, and if the data indicates that the file is marked as dirty, indicating that the file is suspect; otherwise indicating that the file is clean.

19. The system of claim 16, wherein an error code and data corresponding to a file are associated with the error code are non-atomically written to the storage device.

* * * * *